Oct. 2, 1956
H. C. SINGER
2,764,838
COMBINATION CASTING AND STILL FISHING BOBBER
Filed March 10, 1952
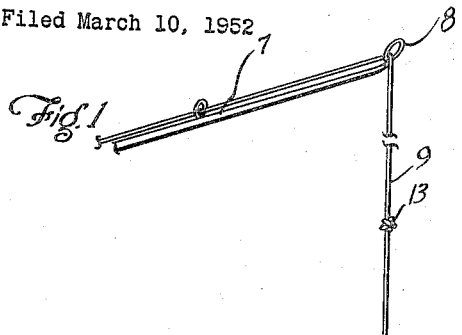
Fig. 1
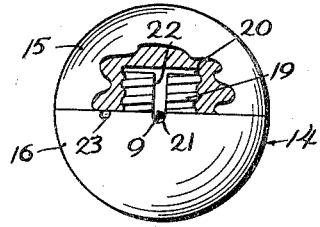
Fig. 2
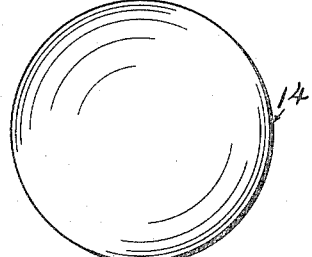
Fig. 3
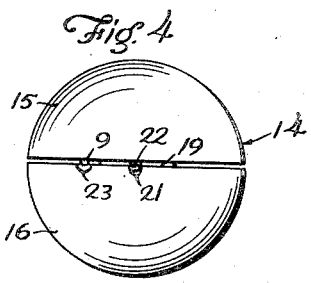
Fig. 4
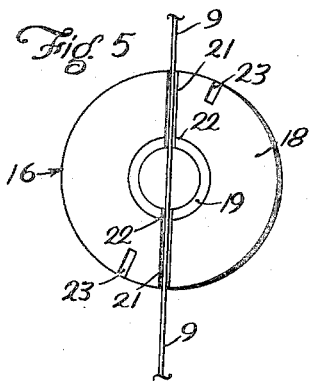
Fig. 5
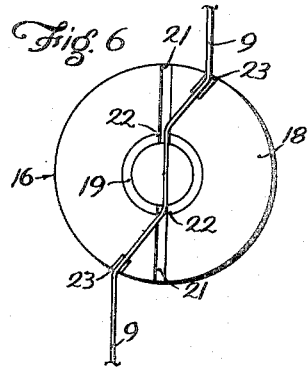
Fig. 6
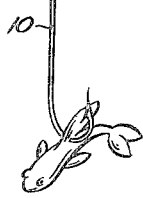
INVENTOR.
Herbert C. Singer
BY *Harry D. Kilgore*
Attorney United States Patent Office 2,764,838
Patented Oct. 2, 1956

2,764,838
COMBINATION CASTING AND STILL FISHING BOBBER

Herbert C. Singer, Minneapolis, Minn.

Application March 10, 1952, Serial No. 275,712

1 Claim. (Cl. 43—44.91)

My invention relates to improvements in floats or bobbers for fishing lines.

It is well known that still fishing with a minnow or other suitable bait is generally practiced with a cane pole and bobber, said bobber being provided to keep a minnow from hiding on the bottom and to indicate fish bites. However, such type of fishing can also be successfully practiced with a bait casting, spinning or fly fishing outfit by the use of my novel bobber, thereby enabling the fisherman to cast his bait much farther and still retain the advantage of the bobber so arranged to float on the surface of the water at a predetermined depth, even when fishing in relatively deep water, wherein it would be impossible to cast a line with a bobber attached at the proper point on the fishing line.

The object of this invention is to provide a novel float or bobber comprising adjustably connected sections applicable to a fishing line to permit free sliding movement of the float or bobber longitudinally between predetermined points on said fishing line, or operable to clamp the fishing line between said section of the float or bobber to prevent relative movement thereof.

To the above end, the invention consists of the novel construction and arrangement of parts hereinafter described and defined in the claim.

In the accompanying drawing, which illustrates the invention, like characters indicate like parts throughout the several views.

Referring to the drawing:

Fig. 1 is a view of a fishing tackle comprising a fragment of a fish pole, a fishing line, intermediate sections of which are broken away, a float stop in the form of a knot tied in the line, a sinker, a fishhook holding a minnow for bait, and a novel float, which is the present invention, applied to the fishing line between the sinker and the knot;

Fig. 2 is an elevational view of the novel float with a portion thereof broken away and sectioned with the fishing line in the groove;

Figs. 3 and 4 are elevational views in which in Fig. 3 the fishing line is in the groove and in Fig. 4 the fishing line is clamped between the sections of the float; and Figs. 5 and 6 are plan views of the lower half of the float with the fishing line positioned, as shown in Figs. 3 and 4, respectively.

The numeral 7 indicates the outer end portion of a conventional bait casting, spinning or fly type fishing rod having at its tip an eye 8 through which a fishing line 9 is threaded. A fishhook 10 to which is attached a bait 11, as shown a minnow, it attached to the outer end of the line 9. A sinker 12 is attached to the line 9 above the hook 10 and a knot 13 is tied in the line 9 above the float or bobber 14 that affords a stop for the float on the line 9, at a predetermined point, which is the subject of the present invention.

The float 14, as shown, comprises two hemispheres 15 and 16 having flat opposing faces or surfaces 17 and 18, respectively. The two hemispheres 15 and 16 are adjustably and detachably connected, at the axis of the float 14, by an upstanding hollow screw stud 19 fixed to the surface 18 of the hemisphere 16, and an internally screw-threaded socket 20 in the surface 17 of the hemisphere 15 into which socket the screw stud 19 is screwed.

Formed in the surface 18 of the hemisphere 16 is a groove 21 that is perpendicular to the axis of said hemisphere and extends completely across said surface, so that the ends thereof are open. The screw stud 19 has diametrically opposite deep notches 22 that form the intermediate portion of the groove 21. Formed in the periphery of the surface 18 are two diametrically opposite nicks 23 positioned on opposite sides of the groove 21.

In Fig. 5 the line 9 is shown extending longitudinally through the groove 21 and the notches 22, which, in a broad sense is a passageway and forms the intermediate portion of said groove. With the line 9 thus positioned, the float 7 is free to move longitudinally on said line.

In Fig. 6 the line 9 is shown extending longitudinally through the notch 22 and outwardly of said notch is turned angularly in opposite directions, lies flat on the surface 18 and is held positioned in the nicks 23. In this position of the line 9 the portions thereof between the screw stud 19 and the nicks 23 are clamped between the surfaces 17 and 18 and the float 7 positively held where positioned on the line 9.

In actual use, in casting a line from a conventional fishing reel, not shown, the use of my float or bobber 14, with the line running freely in the groove 21, permits said line to be retrieved to a point where said float or bobber is stopped by contact with the sinker 12, or the swivel of a conventional leader, not shown, leaving only a relatively short end of line projecting from the rod tip, thereby greatly facilitating the casting maneuver.

While the invention is shown and described as being particularly adaptable for use with tackle equipment of the class described, it will be understood that the invention is capable of adaption to the conventional cane pole and line, in which case my float or bobber may either be used with said bobber running freely in the groove to a knot tied in the line at a predetermined point thereon, or said bobber may be threaded through the diametrically opposite nicks, thereby positively positioning said float or bobber at the desired position on the line.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein, or required by the prior art.

What I claim is:

A float or bobber in the form of a sphere comprising two half-sections having opposing flat surfaces, a large tubular stud fixed to one of said sections and extending into a bore in the other section and having screw-threaded engagement with said other section, the axes of the stud and the bore being coincident with the axis of the sphere, said stud having two diametrically opposite notches formed therein that extend from the outer end of the stud to the flat surface of the respective section and into said surface and outwardly in a direction away from the stud, and two directly opposite positioning notches in the flat surface of the section to which the stud is fixed and extending inwardly from the periphery of said surface, said positioning notches being substantially parallel and in planes that extend in opposite directions substantially tangentially from the outer circumference of the stud, in combination with a fishing line that extends longitudinally in all of the notches in such a manner as to be held in a zigzag formation thereby, said fishing line also being clamped between the flat surfaces of the two sections.

References Cited in the file of this patent

UNITED STATES PATENTS

| | | |
|---|---|---|
| 418,995 | Tufts | Jan. 7, 1890 |
| 1,278,641 | Hancox | Sept. 10, 1918 |
| 2,351,558 | Sykora | June 13, 1944 |
| 2,397,030 | Mercier | Mar. 19, 1946 |
| 2,406,252 | Potter | Aug. 20, 1946 |
| 2,557,877 | Kluson | June 19, 1951 |
| 2,634,474 | Grayson | Apr. 14, 1953 |